United States Patent
Kwon et al.

(10) Patent No.: US 8,953,553 B2
(45) Date of Patent: Feb. 10, 2015

(54) METHOD OF SWITCHING A PERIODIC/APERIODIC TRANSMISSION OF A CHANNEL ESTIMATION REFERENCE SIGNAL, AND APPARATUS AND METHOD FOR A TRANSMITTING/RECEIVING CHANNEL ESTIMATION REFERENCE SIGNAL USING THE SAME

(75) Inventors: Kibum Kwon, Ansan-si (KR); Sungjin Suh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 240 days.

(21) Appl. No.: 13/577,904

(22) PCT Filed: Jan. 28, 2011

(86) PCT No.: PCT/KR2011/000627
§ 371 (c)(1),
(2), (4) Date: Aug. 8, 2012

(87) PCT Pub. No.: WO2011/099715
PCT Pub. Date: Aug. 18, 2011

(65) Prior Publication Data
US 2012/0307772 A1    Dec. 6, 2012

(30) Foreign Application Priority Data
Feb. 11, 2010  (KR) .................. 10-2010-0013045

(51) Int. Cl.
*H04W 4/00* (2009.01)
*H04L 5/00* (2006.01)

(52) U.S. Cl.
CPC ............ *H04L 5/0007* (2013.01); *H04L 5/0053* (2013.01); *H04L 5/0057* (2013.01)
USPC ............................. 370/330; 370/436; 455/509

(58) Field of Classification Search
None
See application file for complete search history.

(56) References Cited

U.S. PATENT DOCUMENTS

| | | | |
|---|---|---|---|
| 7,693,100 B2 * | 4/2010 | Cho et al. | 370/328 |
| 8,295,778 B2 * | 10/2012 | Kotecha et al. | 455/69 |
| 2006/0256805 A1 * | 11/2006 | Cho et al. | 370/431 |
| 2008/0045228 A1 * | 2/2008 | Zhang et al. | 455/450 |
| 2009/0022135 A1 | 1/2009 | Papasakellariou et al. | |
| 2009/0042558 A1 | 2/2009 | Shen et al. | |
| 2009/0046645 A1 | 2/2009 | Bertrand et al. | |
| 2009/0274100 A1 | 11/2009 | Montojo et al. | |
| 2011/0268087 A1 * | 11/2011 | Kwon et al. | 370/331 |
| 2013/0053083 A1 * | 2/2013 | Suh et al. | 455/509 |
| 2013/0223397 A1 * | 8/2013 | Kim et al. | 370/329 |

OTHER PUBLICATIONS

International Search Report of PCT/KR2011/000627 dated Oct. 28, 2011.

* cited by examiner

*Primary Examiner* — Donald Mills
(74) *Attorney, Agent, or Firm* — H.C. Park & Associates, PLC

(57) ABSTRACT

A method for switching between periodic transmission and aperiodic transmission of a channel estimation reference signal for scheduling resources in an Orthogonal Frequency Division Multiple Access (OFDMA) system and an apparatus to transmit/receive the reference signal using the same. To schedule periodic and aperiodic transmission of the channel estimation reference signal, a predetermined type of transmission indicator is used, the transmission indicator including one or more bits of a periodic/aperiodic identification indicator. According to the present embodiment, when periodic and aperiodic transmission of the channel estimation reference signal is mixedly performed, interference between user equipment or between cells can be minimized, and a transmission efficiency of the reference signal can be enhanced.

11 Claims, 13 Drawing Sheets

FIG.2
(2a)
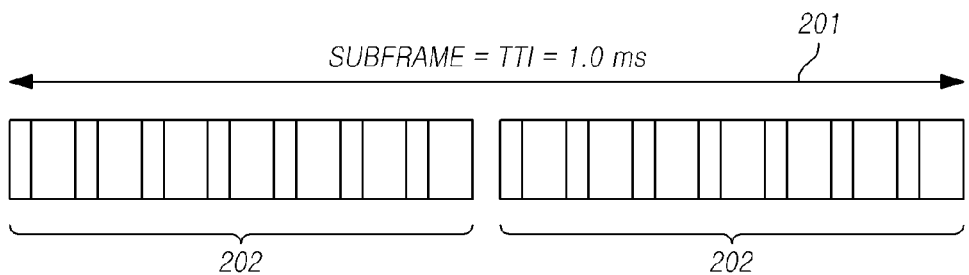
(2b)
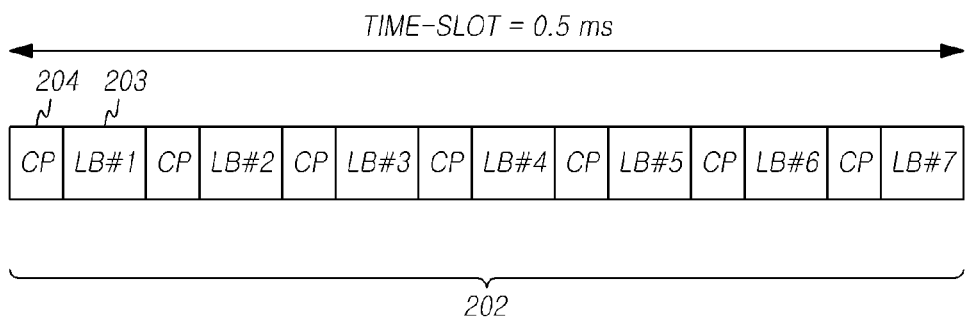
(2c)
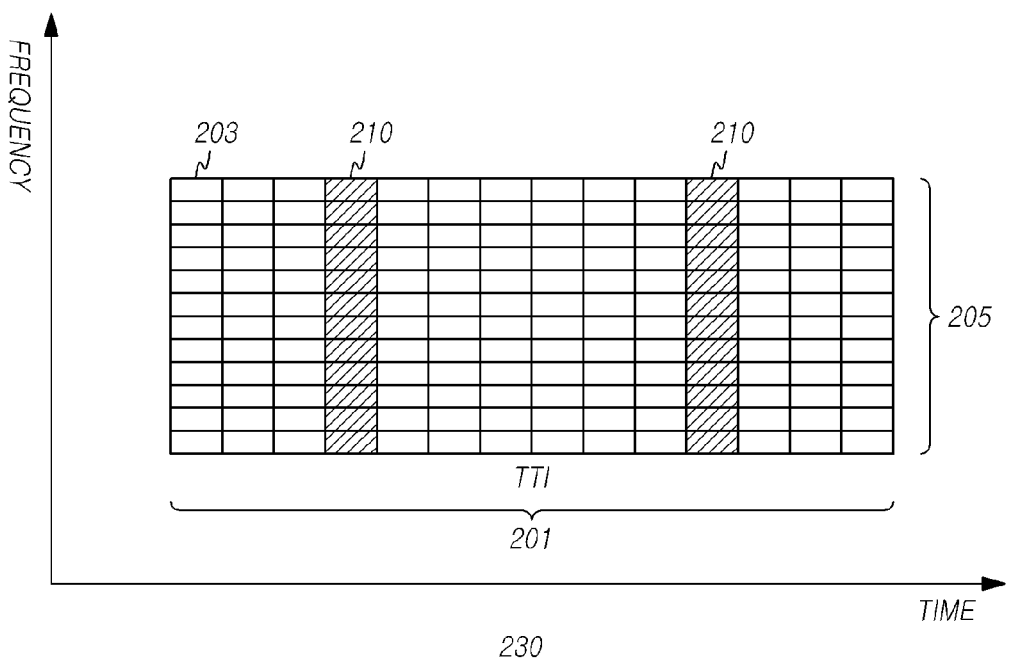

METHOD OF SWITCHING A PERIODIC/APERIODIC TRANSMISSION OF A CHANNEL ESTIMATION REFERENCE SIGNAL, AND APPARATUS AND METHOD FOR A TRANSMITTING/RECEIVING CHANNEL ESTIMATION REFERENCE SIGNAL USING THE SAME

CROSS-REFERENCE TO RELATED APPLICATIONS

This application is the National Stage Entry of International Application No. PCT/KR2011/000627, filed on Jan. 28, 2011 and claims priority from and the benefit of Korean Patent Application No. 10-2010-0013045, filed on Feb. 11, 2010, all of which are hereby incorporated by reference for all purposes as if fully set forth herein.

BACKGROUND

1. Field

The present disclosure relates to a radio communication system, and more particularly, to a method of switching between periodic transmission and aperiodic transmission of a channel estimation reference signal for scheduling resources in an Orthogonal Frequency Division Multiple Access (OFDMA) radio communication system, and a reference signal transceiving apparatus using the same.

2. Discussion of the Background

As communication systems have developed, various wireless terminals have been utilized by consumers, such as companies and individuals.

A current mobile communication system, for example, $3^{rd}$ Generation Partnership Project (3GPP), Long Term Evolution (LTE), LTE-Advanced (LTE-A), and the like, may be a high capacity communication system capable of transmitting and receiving various data such as image data, wireless data, and the like, beyond providing a sound-based service. Accordingly, there is a desire for a technology that transmits high capacity data, which is comparable with a wired communication network. Also, the system is required to include an appropriate error detection scheme that increases transmission efficiency of the system so as to improve performance of the system.

Also, varied reference signals have been utilized in current various communication systems to provide information associated with a communication environment and the like, to a corresponding apparatus through an uplink (UL) or a downlink (DL).

For example, an LTE system, which is one of the mobile communication methods, transmits a sounding reference signal to a base station (BS) as a channel estimation reference signal indicating a channel status of a user equipment (UE) during UL transmission, and transmits a reference signal or a cell-specific reference signal at every subframe to recognize channel information during DL transmission.

In general, the reference signal may be periodically generated by a reference signal transmitting apparatus, that is, a UE in a case where the reference signal for channel estimation and the like corresponds to a UL reference signal, and a BS in a case where the reference signal for channel estimation and the like corresponds to a DL reference signal, and may be transmitted to a reference signal receiving apparatus.

Although aperiodic transmission of a channel estimation reference signal and the like has been discussed in consideration of a flexibility of a communication system and the like, a detailed scheme thereof has not yet been determined.

SUMMARY

Therefore, the present invention has been made in view of the above-mentioned problems, and an aspect of the present invention is to provide a scheme for switching periodic transmission and aperiodic transmission of a channel estimation reference signal.

Another aspect of the present invention is to provide a scheme of utilizing a transmission indicator of two or more bits, separately defined to instruct periodic transmission and aperiodic transmission of a channel estimation reference signal.

Another aspect of the present invention is to provide a scheme of utilizing a periodic/aperiodic indicator of one or more bits, separately defined to distinguish a periodic transmission section and an aperiodic transmission section of a channel estimation reference signal.

Another aspect of the present invention is to provide a method and apparatus for periodically and aperiodically transceiving a channel estimation reference signal through use of a transmission indicator including a periodic/aperiodic indicator and a trigger indicator.

Another aspect of the present invention is to provide a scheme for utilizing an indicator of one or more bits, separately defined to distinguish or indicate an aperiodic transmission section of a channel estimation reference signal in a cooperative multipoint transmit (Tx)/receive (Rx) system (CoMP).

In accordance with an aspect of the present invention, there is provided a method of switching periodic transmission and aperiodic transmission of a channel estimation reference signal for scheduling resources in an Orthogonal Frequency Division Multiple Access (OFDMA) communication system, the method including: determining a periodic transmission section where the channel estimation reference signal is periodically transmitted, and an aperiodic transmission section where the channel estimation reference signal is aperiodically transmitted; and generating and transmitting a periodic/aperiodic indicator to distinguish the periodic transmission section and the aperiodic transmission section, or a transmission indicator including the periodic/aperiodic indicator.

In accordance with another aspect of the present invention, there is provided a method of switching a channel estimation reference signal between a macro base station (BS) and a micro BS, the method including: performing, by the macro BS, periodic transmission of a channel estimation reference signal; and performing, by the micro BS, aperiodic transmission of a channel estimation reference signal.

In accordance with another aspect of the present invention, there is provided an apparatus for receiving a channel estimation reference signal for scheduling resources in an OFDMA communication system, the apparatus including: a periodic/aperiodic indicator processing unit to determine whether switching between a periodic transmission mode and an aperiodic transmission mode for a channel estimation reference signal is required, and to generate and transmit a periodic/aperiodic indicator of one or more bits instructing switching of a mode or a transmission indicator of two or more bits including the periodic/aperiodic indicator; and a channel estimation reference signal receiving unit to periodically and aperiodically receive a channel estimation reference signal transmitted from a corresponding apparatus, based on the periodic/aperiodic indicator or the transmission indicator.

In accordance with another aspect of the present invention, there is provided an apparatus for transmitting a channel estimation reference signal for scheduling resources in an OFDMA communication system, the apparatus including: a periodic/aperiodic indicator receiving/analyzing unit to receive a transmission indicator including a periodic/aperiodic indicator of one or more bits, to determine a predetermined subframe in a periodic transmission section to be a periodic channel estimation reference signal transmission subframe based on the transmission indicator, and to determine a predetermined subframe in an aperiodic transmission section to be an aperiodic channel estimation reference signal transmission subframe based on the transmission indicator; a channel estimation reference signal generating unit to generate a channel estimation reference signal; and a channel estimation reference signal transmitting unit to perform mapping of the generated channel estimation reference signal on the periodic channel estimation reference signal transmission subframe and the aperiodic channel estimation reference signal transmission subframe, for transmission.

In accordance with another aspect of the present invention, there is provided a method of receiving a channel estimation reference signal for scheduling resources in an OFDMA communication system, the method including: scheduling a periodic channel estimation reference signal transmission section and an aperiodic channel estimation reference signal transmission section, with respect to a predetermined user equipment (UE); generating a transmission indicator including a periodic/aperiodic indicator of one or more bits, and transmitting the transmission indicator to the UE; and receiving a channel estimation reference signal periodically and aperiodically, from the corresponding UE.

In accordance with another aspect of the present invention, there is provided a method of transmitting a channel estimation reference signal for scheduling resources in an OFMDA communication system, the method including: receiving a transmission indicator including a periodic/aperiodic indicator of one or more bits; determining a predetermined subframe in a periodic transmission section to be a periodic channel estimation reference signal transmission subframe based on the transmission indicator, and determining a predetermined subframe in an aperiodic transmission section to be an aperiodic channel estimation reference signal transmission subframe based on the transmission indicator; and transmitting the channel estimation reference signal by including the channel estimation reference in the determined periodic channel estimation reference signal transmission subframe and the aperiodic channel estimation reference signal transmission subframe.

BRIEF DESCRIPTION OF THE DRAWINGS

FIG. 2 is a diagram illustrating a general structure of a subframe and a time-slot of transmission data according to an embodiment of the present invention;

DETAILED DESCRIPTION OF THE ILLUSTRATED EMBODIMENT

Figure 1:
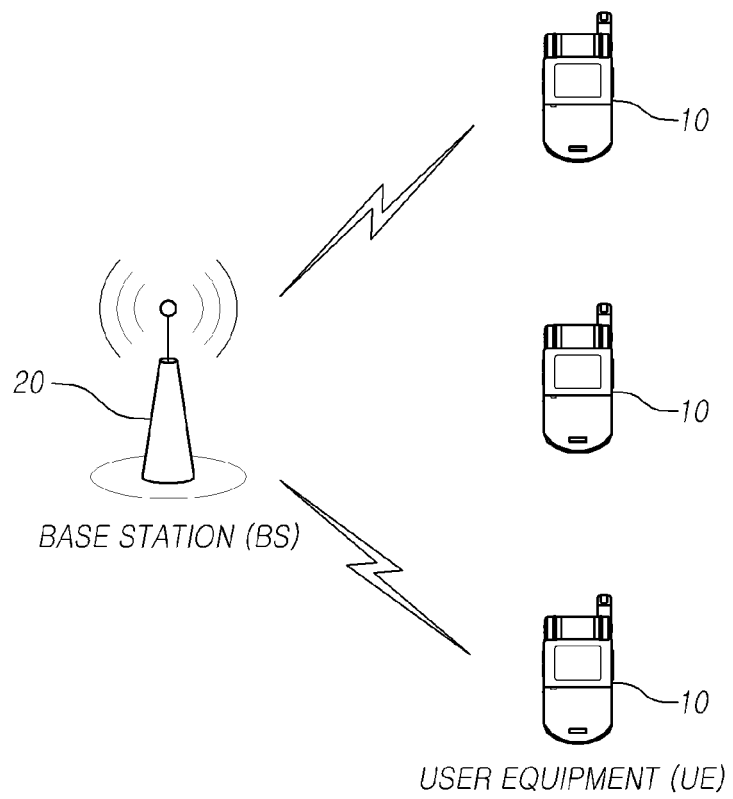
FIG. 1 is a diagram of a radio communication system according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 illustrates a radio communication system according to an embodiment of the present invention.

The radio communication system may be widely installed so as to provide various communication services, such as a voice service, packet data, and the like.

Referring to FIG. 1, the radio communication system may include a user equipment (UE) 10 and a base station (BS) 20. The UE 10 and the BS 20 may use a periodic and aperiodic transmission switching scheme for a channel estimation reference signal, which will be described in detail from FIG. 7.

Throughout the specifications, the UE 10 may be an inclusive concept indicating a user terminal utilized in radio communication, including a UE in Wideband Code Division Multiple Access (WCDMA), Long Term Evolution (LTE), High Speed Packet Access (HSPA), and the like, and a mobile station (MS), a user terminal (UT), a subscriber station (SS), a wireless device, and the like in Global System for Mobile Communications (GSM).

In the specifications, the UE 10 and the BS 20 are used as two inclusive transceiving subjects to embody the technology and technical concepts described in the specifications, and may not be limited to a predetermined term or word.

A multiple access scheme applied to the radio communication system may not be limited. The radio communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like.

Uplink (UL) transmission and downlink (DL) transmission may be performed based on a time division duplex (TDD) scheme that performs transmission based on different times, or based on a frequency division duplex (FDD) scheme that performs transmission based on different frequencies.

An embodiment of the present invention may be applicable to resource allocation in an asynchronous radio communication scheme that is advanced through GSM, WCDMA, and HSPA, to be LTE and LTE-advanced, and may be applicable to resource allocation in a synchronous radio communication scheme that is advanced through CDMA and CDMA-2000, to be Ultra Mobile Broadband (UMB). Embodiments of the present invention may not be limited to a specific radio communication scheme, and may be applicable to all technical fields to which a technical idea of the present invention is applicable.

A radio communication system according to embodiments of the present invention may support a UL and/or DL Hybrid Automatic Repeat Request (HARQ), and may use a channel quality indicator (CQI) for link adaptation. Also, a multiple access scheme for DL transmission and a multiple access scheme for UL transmission may be different from each other. For example, OFDMA may be used for the DL transmission, and a single carrier-frequency division multiple access (SC-FDMA) may be used for the UL transmission.

Layers of radio interface protocol between a UE and a network may be distinguished as a first layer (L1), a second layer (L2), and a third layer (L3), based on three lower layers of a well-known open system interconnection (OSI) model in a communication system, and a physical layer of the first layer may provide an information transfer service through use of a physical channel.

According to an embodiment of the present invention, in a radio communication system, for example, a single radio frame may be formed of ten subframes and a single subframe may be formed of two slots.

A basic unit for data transmission may be a subframe, and UL scheduling or DL scheduling may be performed based on a subframe unit. A single slot may include a plurality of OFDM symbols in a time domain, and may include at least one subcarrier in a frequency domain, and a single slot may include 7 or 6 OFDM symbols.

For example, when a subframe is formed of two time-slots, each time-slot includes 7 symbols in a time domain and 12 subcarriers in a frequency domain. Although a time-frequency domain defined by a single slot as described in the foregoing may be referred to as a resource block (RB), it may not be limited thereto.

FIG. 2 illustrates various structures of a subframe and a time-slot according to an embodiment of the present invention.

FIG. 2a illustrates a subframe 201 having duration of 1.0 millisecond (ms), and the single subframe 201 may include two time-slots 202. Here, the subframe 201 may be referred to as a transmission time interval (TTI). "TTI" and "subframe" may be directed to the same meaning, and a frame having a length of 10 ms may include 10 TTIs.

FIG. 2b illustrates a structure of a time-slot according to an embodiment of the present invention. As described in the foregoing, the TTI may be a basic transmission unit, and a single TTI may include two time-slots 202 of the same length and each time-slot has duration of 0.5 ms. The time-slot may include seven long blocks (LBs) 203 associated with symbols. The LBs may be separated by cyclic prefixes (CPs) 204. Although a single TTI or a subframe may include 14 LB symbols, embodiments of the present invention may not be limited to the structure of the frame, the subframe, or the time-slot as described in the foregoing.

FIG. 2C illustrates a configuration of the single RB 230 during a single subframe or the TTI 201 according to an exemplary embodiment of the present invention. Each TTI or each subframe may be divided into 14 symbols (axes) 220 in a time domain. Each symbol (axis) may carry a single symbol.

Also, a total system bandwidth of 20 megahertz (MHz) may be separated or divided into different frequency subcarriers 205. As illustrated in FIG. 2C, a single TTI is formed of 12 successive subcarriers, and a time-frequency domain formed of 14 symbols in a time domain and 12 subcarriers in a frequency domain may be referred to as an RB.

For example, in 1 TTI, a bandwidth of 10 MHz may include 50 RBs in a frequency domain.

Each of lattices forming the RB may be referred to as a resource element (RE), and 168 (14×12=168) REs may exist in each subframe based on the structure described in the foregoing.

In an LTE communication system, which is one of the current radio communication schemes, a demodulation reference signal (DMRS) and a sounding reference signal (SRS) are defined for a UL, and three reference signals (RSs), that is, a Carrier Routing System (CRS), a multicast/broadcast over single frequency network reference signal (MBSFN-RS), and a UE-specific reference signal, are defined for a DL.

That is, a UE in the radio communication system may transmit, to a BS, a UL channel estimation reference signal which is one of the reference signals, so as to transfer UL channel information to the BS.

An example of the channel estimation reference signal may include an SRS that is used in LTE and LTE-Advanced, and the channel estimation reference signal may function as a pilot channel with respect to a UL channel.

In the specifications, embodiments of the present invention will be described based on an SRS which is an example of the channel estimation reference signal, the invention may not be limited to the SRS and may include all types of reference signals used in a UL or a DL.

The SRS may need to transfer UL channel information associated with all bands including a band to be used by each UE and a band having a probability of being used by each UE. That is, the SRS may need to be transmitted over the entire subcarrier band.

According to the current LTE standard, an SRS sequence may be generated based on Equation 1, and the generated SRS sequence may go through resource mapping and may be transmitted based on a subframe setting as shown in Table 1.

$$r^{SRS}(n) = r_{u,v}^{(\alpha)}(n) = e^{j\alpha n} \bar{r}_{(u,v)}(n), \ 0 \leq n \leq M_{sc}^{RS}$$ [Equation 1]

Here, $M_{sc}^{RS} = mN_{sc}^{RB}$ denotes a length of a reference signal sequence, and $1 \leq m \leq N_{RB}^{max,UL}$. u denotes a Physical Uplink Control Channel (PUCCH) sequence group number, v denotes a base sequence number, and a cyclic shift (CS)

$$\alpha = 2\pi \frac{n_{SRS}^{cs}}{8} n_{SRS}^{cs}$$

may be an integer value in a range from 0 through 7, and may be set for each UE by a upper layer.

TABLE 1

| srsSubframeCon-figuration | Binary | Configuration Period (subframes) | Transmission offset (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | Inf | N/A |

Table 1 may be a subframe setting table of an FDD sounding reference signal, defined in LTE. Each srsSubframeConfiguration may be defined by four bits, and a transmission period and an offset of a transmission subframe may be defined for each case.

That is, when a value of srsSubframeConfiguration is 8 (i.e., 1000 in the binary system), an SRS may be transmitted at second and third subframes in every five subframes.

Figure 3:
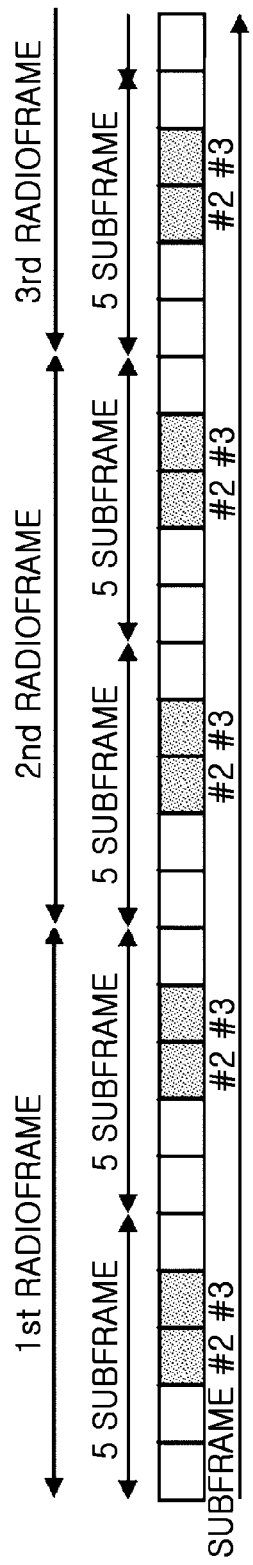
FIG. 3 is a diagram illustrating an example of periodic sounding reference signal (SRS) transmission in a communication system according to an embodiment of the present invention.

FIG. 3 illustrates an example of periodic SRS transmission in a communication system according to an embodiment of the present invention. For example, when a value of srsSubframeConfiguration is 8 (i.e., 1000 in the binary system), an SRS may be transmitted at second and third subframes in every five subframes.

However, the SRS may be transmitted at the last symbol of each subframe, but it may not be limited thereto.

According to the SRS setting as shown in Table 1 and FIG. 3, an SRS may be periodically transmitted at each radio frame or each transmission period, for each cell (or a BS).

However, as a communication system has advanced, a number of antennas increases, such as a multi input multi output (MIMO), and a communication system, such as a CoMP, that requires transmission and reception of a reference signal with a neighbor cell in addition to a serving cell that mainly performs transmission and reception with a corresponding user has been introduced. Therefore, there has been an opinion that a current SRS capacitor may be insufficient.

Accordingly, it has been discussed that scheduling flexibility of an SRS needs to be increased by adjusting an SRS which is transmitted periodically to be transmitted aperiodically, so as to improve the SRS capacitor.

The embodiment of the present invention may be provided in terms of the above point of view, and may provide a method and apparatus for switching periodic transmission and aperiodic transmission of a channel estimation reference signal based on a predetermined time interval, and may perform signaling of a periodic/aperiodic indicator of one or more bits, separately defined to distinguish a periodic transmission section and an aperiodic transmission section.

That is, describing in terms of the method, the embodiment of the present invention is to provide a method of switching periodic transmission and aperiodic transmission of a channel estimation reference signal, and the method may include determining a periodic transmission section where a channel estimation reference signal is periodically transmitted, and an aperiodic transmission section where a channel estimation reference signal is aperiodically transmitted, and generating and transmitting a transmission indicator including a periodic/aperiodic indicator to indicate the periodic transmission section and the aperiodic transmission section.

The transmission indicator is formed of two or more bits, at least one bit of the transmission indicator may be the periodic/aperiodic indicator indicating whether a corresponding subframe corresponds to the periodic transmission section or the aperiodic transmission section, and remaining bits may be a trigger indicator indicating whether to activate or deactivate SRS transmission in the corresponding subframe, but this may not be limited thereto.

The transmission indicator and the periodic/aperiodic indicator may be transmitted at time intervals, the time interval being sufficient for adaptation to a dynamic environment that requires switching of the periodic transmission and aperiodic transmission, and may be transmitted through a physical layer (L1) signaling or a data link layer (L2) signaling, but this may not be limited thereto.

The transmission indicator and the periodic/aperiodic indicator may be distinguished as a first indicator indicating an aperiodic start or a periodic end, and a second indicator indicating a periodic start or an aperiodic end. Here, the first and the second indicator may be expressed through use of substitution.

Also, the transmission indicator and the periodic/aperiodic indicator may be included in a separately defined downlink control information (DCI) format, and may be transmitted through a physical downlink control channel (PDCCH), but this may not be limited thereto.

Also, in a case where a plurality of UEs exists in a single cell, when the transmission indicator is transmitted, an SRS deactivation indicator that instructs to not transmit an SRS in a subframe where an aperiodic transmission UE transmits an SRS, may be included in the transmission indicator and may be transmitted to remaining UEs excluding UEs (i.e., aperiodic transmission UEs) to which aperiodic SRS is applied, that is, UEs that perform only periodic SRS transmission.

The channel estimation reference signal according to the embodiment of the present invention may be a channel estimation reference signal for scheduling resources in an OFDMA system. A representative example of the channel estimation reference signal may be an SRS in a UL, but it may not be limited thereto.

Figure 4:
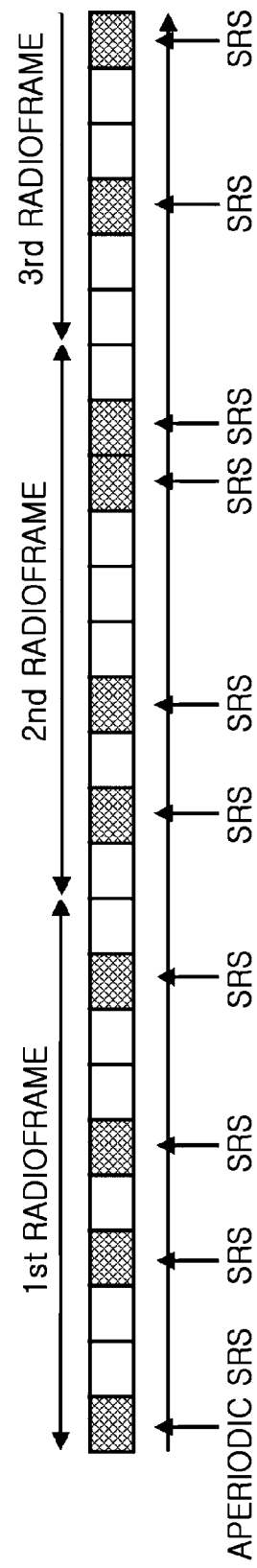
FIG. 4 is a diagram illustrating a configuration of a frame for aperiodic SRS transmission according to an embodiment of the present invention.

FIG. 4 illustrates a configuration of a frame for aperiodic SRS transmission according to an embodiment of the present invention.

Referring to FIG. 4, an example of aperiodic SRS transmission is illustrated. An SRS may be transmitted at a first subframe (i.e., subframe No.=0), a fourth subframe (i.e., subframe No.=3), a sixth subframe (i.e., subframe No.=5), and a ninth subframe (i.e., subframe No.=8) in a first radio frame, and an SRS may be transmitted at a second subframe (i.e., subframe No.=1), a fourth subframe (i.e., subframe No.=3), an eighth subframe (i.e., subframe No.=7), and a ninth subframe (i.e., subframe No.=8) in a second radio frame.

That is, in the aperiodic SRS transmission, an SRS may need to be transmitted at a desired timing as shown in FIG. 4.

Figure 5:
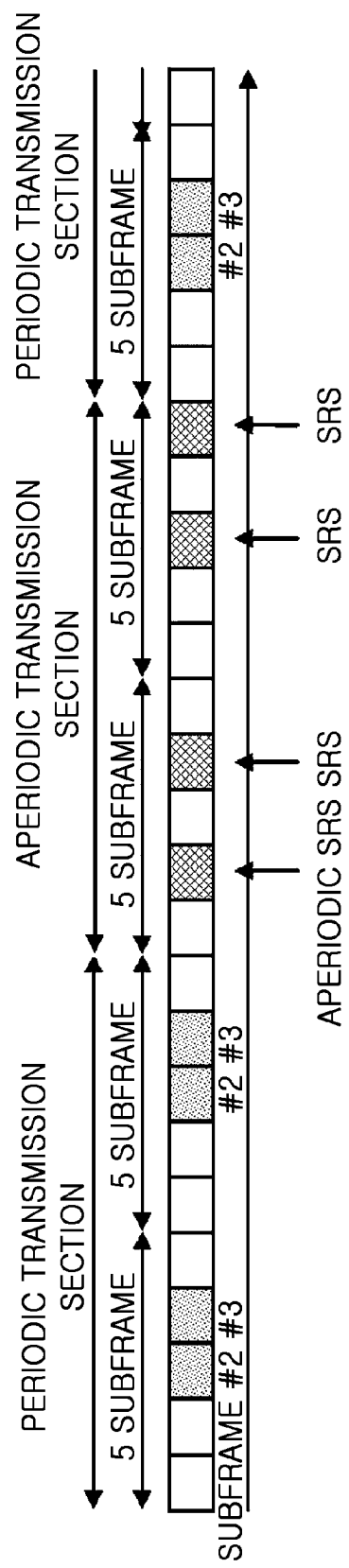
FIG. 5 and FIG. 6 are diagrams illustrating a configuration of a frame when periodic and aperiodic SRS transmission switching is applied according to an embodiment of the present invention.
Figure 6:
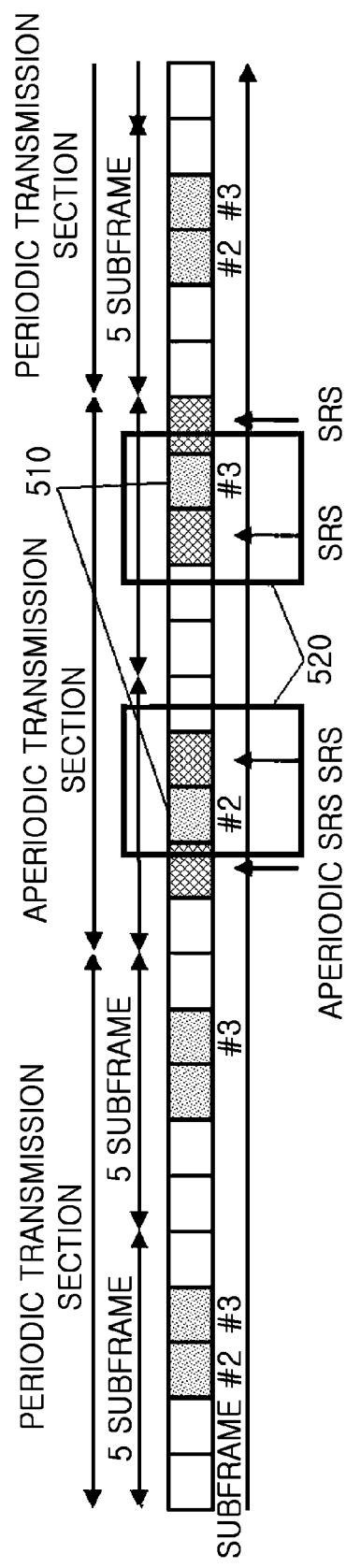

FIGS. 5 and 6 illustrate a configuration of a frame when periodic and aperiodic SRS transmission switching is applied according to an embodiment of the present invention.

Referring to FIG. 5, an SRS may be periodically transmitted in first radio frame and third radio frame (i.e., SRS is transmitted at subframes corresponding to subframe No. 2 and subframe No. 3 in every five subframes) as shown in FIG. 3. However, in a second radio frame, an SRS may be aperiodically transmitted at subframes corresponding to a subframe corresponding to a subframe No. 1 (i.e., a second subframe), a subframe corresponding to a subframe No. 3 (i.e., a fourth subframe), a subframe corresponding to a subframe No. 7 (i.e., an eighth subframe), and a subframe corresponding to a subframe No. 9 (i.e., a tenth subframe). This may be merely an example and switching of periodic SRS transmission and aperiodic SRS transmission based on another scheme may be available.

FIG. 5 shows an example of switching in an order of periodic SRS transmission→aperiodic SRS transmission→periodic SRS transmission, based on a radio frame unit. When a switching time does not accurately match during the switching, a drawback of FIG. 6 may occur.

That is, as shown in FIG. 6, a drawback may occur in that an existing periodic SRS transmission (i.e., subframe No. 2 and subframe No. 3 of aperiodic transmission section 510) is performed as it is during aperiodic SRS transmission, and a drawback may occur in that periodic SRS transmission is missed since a periodic transmission section and an aperiodic transmission section are not distinguished even though the periodic SRS transmission section (i.e., a third radio frame of FIG. 5) starts again after the aperiodic SRS transmission is completed.

Also, as shown in FIG. 5 and FIG. 6, when the existing periodic SRS transmission and the aperiodic SRS transmission are used together, following drawbacks may occur.

When the existing periodic SRS transmission is performed, an SRS period may be set for each of UEs to not interfere with one another. In addition, in a case of a multi-cell, an SRS transmission period and an offset may be set by taking into consideration interference with a neighbor cell. In this example, when aperiodic SRS transmission is allocated to a user without taking into consideration the interference, interference may occur in another user in the same cell or a user in a neighbor cell. Therefore, when the aperiodic SRS transmission is allocated to a user, the aperiodic SRS transmission may need to be performed within a range that may not cause interference with SRS transmission of another user in the same cell or a user in a neighbor cell.

Also, as shown in FIG. 6, when an accurate switching time or a periodic transmission section and an aperiodic transmission section are not reported during a process of periodic/aperiodic switching, a case 520 in which periodic SRS transmission time and the aperiodic SRS transmission time overlap each other may occur. Also, when the switching time is inaccurate, periodic SRS transmission and aperiodic SRS transmission may overlap each other and thus, SRS transmission more than other users in the same cell may be performed.

Although SRSs more than other users are transmitted, performance of a corresponding user may not be deteriorated. However, a transmission time of an SRS may have a high probability of being the same as a transmission time of an SRS of another user and thus, interference may be highly likely to happen. Therefore, the periodic SRS transmission time and the aperiodic SRS transmission time may need to be accurately distinguished. Also, there may be a drawback in that periodic SRS transmission is missed since a switching time does match even though the periodic SRS transmission needs to start after the periodic SRS transmission is completed.

Accordingly, the embodiment of the present invention may prevent overlapping or missing of an SRS during the switching of the periodic SRS transmission and the aperiodic SRS transmission, and may use a periodic/aperiodic indicator to prevent interference which may be caused by the overlapping or the missing phenomenon.

Figure 7:
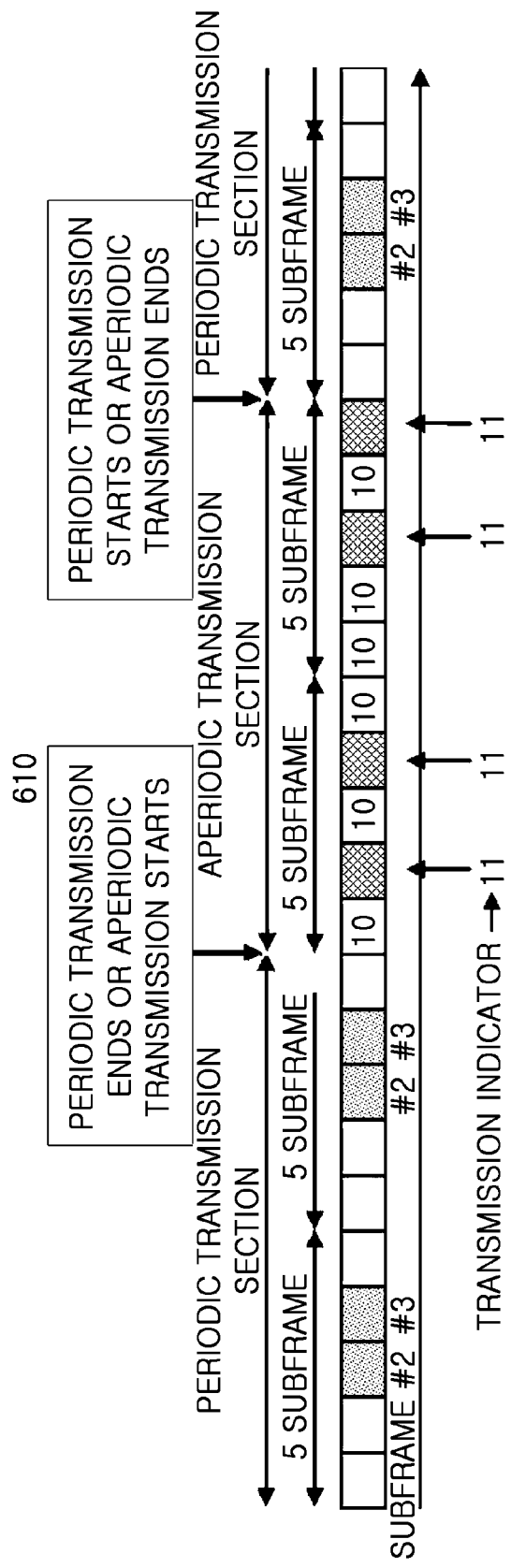
FIG. 7 and FIG. 8 are diagrams illustrating examples of periodic and aperiodic SRS transmission switching, including a transmission indicator, according to an embodiment of the present invention.
Figure 8:
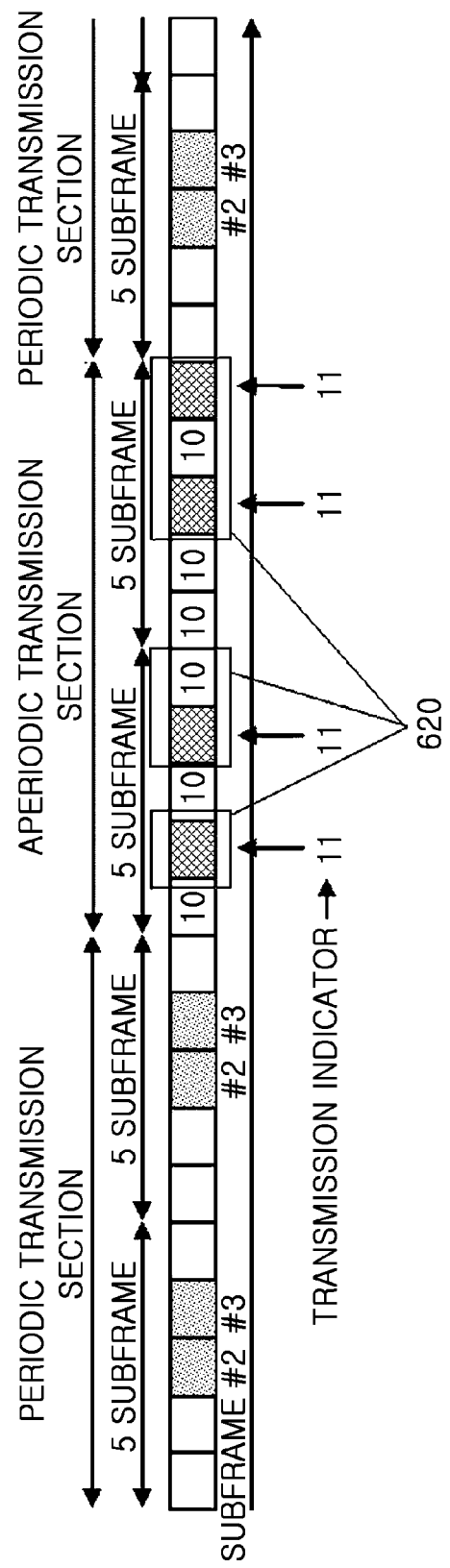

FIG. 7 and FIG. 8 illustrate examples of periodic and aperiodic SRS transmission switching, including a transmission indicator, according to an embodiment of the present invention.

As shown in FIG. 7 and FIG. 8, in a case 610 where periodic SRS transmission is switched into an aperiodic SRS transmission section, a BS may transmit a transmission indicator to a UE.

The transmission indicator may be formed of a 1 bit signal through an L1 signaling, that is, only a trigger indicator. That is, the BS may transmit a 1 bit signaling to each UE, so as to trigger to perform aperiodic SRS transmission. Further, k subframes after the BS transmits the 1 bit signaling to a UE, the UE may transmit an SRS or the BS may receive an SRS. In this example, k may be set to be different for each system.

However, when the transmission indicator performs signaling including only 1 bit of the trigger indicator, the drawback of FIG. 6 may be highly likely to happen. A 1 bit signaling for an aperiodic SRS trigger may provide only information associated with whether to transmit an aperiodic SRS in a predetermined subframe, and may not provide a start and an end of the aperiodic SRS.

When aperiodic SRS transmission and periodic SRS transmission overlap each other, the overlapping may be overcome based on a priority. However, it may not be helpful when an SRS is additionally transmitted or missed, as opposed to the overlapping.

Therefore, according to the embodiment of the present invention, the transmission indicator may be formed of two or more bits, at least one bit of them may be used as a periodic/aperiodic indicator to indicate a periodic transmission section and an aperiodic transmission section, and may be transmitted, to a UE, through a physical layer (L1) signaling or a data link layer (L2) signaling so as to be transmitted at the same periods as an existing aperiodic SRS trigger signaling.

In this example, 1 bit of the transmission indicator of two bits may be a periodic/aperiodic indicator to distinguish the periodic transmission section and the aperiodic transmission section, and remaining bits may be a trigger indicator indicating whether to activate or deactivate SRS transmission in a corresponding subframe, but this may not be limited thereto.

For example, in the transmission indicator of two bits, a front 1 bit may be used as the periodic/aperiodic indicator and a rear 1 bit may be used as the trigger indicator to indicate whether to perform SRS transmission in the corresponding subframe.

When the periodic/aperiodic indicator is 0, a corresponding section may be defined to be the periodic transmission section, and when the periodic/aperiodic indicator is 1, the corresponding section may be defined to be the aperiodic transmission section. When the trigger indicator is 0, an SRS may not be transmitted in a corresponding subframe, and when the trigger indicator is 1, an SRS may be transmitted in the corresponding subframe.

In this example, when the transmission indicator is (00), the periodic SRS transmission may be applied, and an SRS may not be transmitted in a corresponding subframe. When the transmission indicator is (10), the aperiodic SRS transmission may be applied, and an SRS may not be transmitted in the corresponding subframe. When the transmission indicator is 11, the aperiodic SRS transmission may be applied, and an SRS may be transmitted in the corresponding subframe. This may be merely an example, and other examples may be applicable.

In the same manner as the 1 bit aperiodic SRS trigger signaling, k subframes before the corresponding subframe, the periodic/aperiodic indicator is transmitted to the UE through a L1 or L2 signaling, and SRS transmission or non-transmission may be performed in the corresponding subframe based on the periodic/aperiodic indicator.

In general, signaling of the periodic/aperiodic indicator and the trigger indicator included in the transmission indicator may be simultaneously performed, but it may not be limited thereto and the periodic/aperiodic indicator and the trigger indicator included in the transmission indicator may be transmitted to a UE through a separate signaling procedure.

When the same example is applied to FIG. 7, transmission indicators of (00), (00), (01), (01), (00), (00), (00), (01), (01), and (00) may be transmitted in an order of subframe in a first radio frame corresponding to a periodic SRS transmission section, transmission indicators of (10), (11), (10), (11), (10), (10), (10), (11), (11), and (10) may be transmitted in an order of subframe in a second radio frame when the periodic SRS transmission section is switched into aperiodic SRS transmission, and then transmission indicators of (00), (00), (01), (01), (00), (00), (00), (01), (01), and (00) may be transmitted in an order of subframe when the aperiodic SRS transmission is switched into a third radio frame corresponding to the periodic SRS transmission section.

In the existing periodic SRS transmission section, a transmission indicator or a periodic/aperiodic indicator may not be separately transmitted. That is, in FIG. 7, a transmission indicator or a periodic/aperiodic indicator may not be transmitted in the first radio frame and the third radio frame, and transmission indicators of (10), (11), (10), (11), (10), (10), (10), (11), (11), and (10) may be transmitted in an order of subframe in the second radio frame corresponding to a section that is switched into the aperiodic SRS transmission section.

According to another embodiment of the present invention, when a BS generates a time indicator or a trigger indicator to designate a subframe where aperiodic SRS transmission is to be performed, for a UE, as shown in FIG. 8, the BS may generate the transmission indicator or the trigger indicator to selectively indicate a few subframes within a characterized range 620 of subframes as shown in FIG. 8, as opposed to indicating a few subframes in a corresponding radio frame as illustrated in FIG. 7.

That is, a few subframes (e.g., four subframes corresponding to subframe No. 1, subframe No. 3, subframe No. 7, and subframe No. 8 under the condition of FIG. 7 and FIG. 8) may be selected within a subframe range (e.g., subframes corresponding to subframe No. 1, subframe No. 3, subframe No. 4, subframe No. 7, subframe No. 8, and subframe No. 9) in a block marked by a straight line in the second radio frame corresponding to the aperiodic SRS transmission section, and the transmission indicator and the trigger indicator may be generated to indicate to transmit an aperiodic SRS with respect to only the selected subframes.

The characterized range of subframes may be independently determined by the corresponding BS, or may be determined by negotiation with a neighbor BS through a signaling in a case of a multi-cell.

The characterized range of subframes may be fixed continuously during a predetermined period. A periodic/aperiodic switching apparatus according to the embodiment of the present invention may select a few subframes that satisfy a condition that minimizes inter-UE interference or inter-cell interference from among subframes in the corresponding range, and may generate and transmit a periodic/aperiodic indicator so that aperiodic SRS transmission is performed in the selected few subframes.

Figure 9:
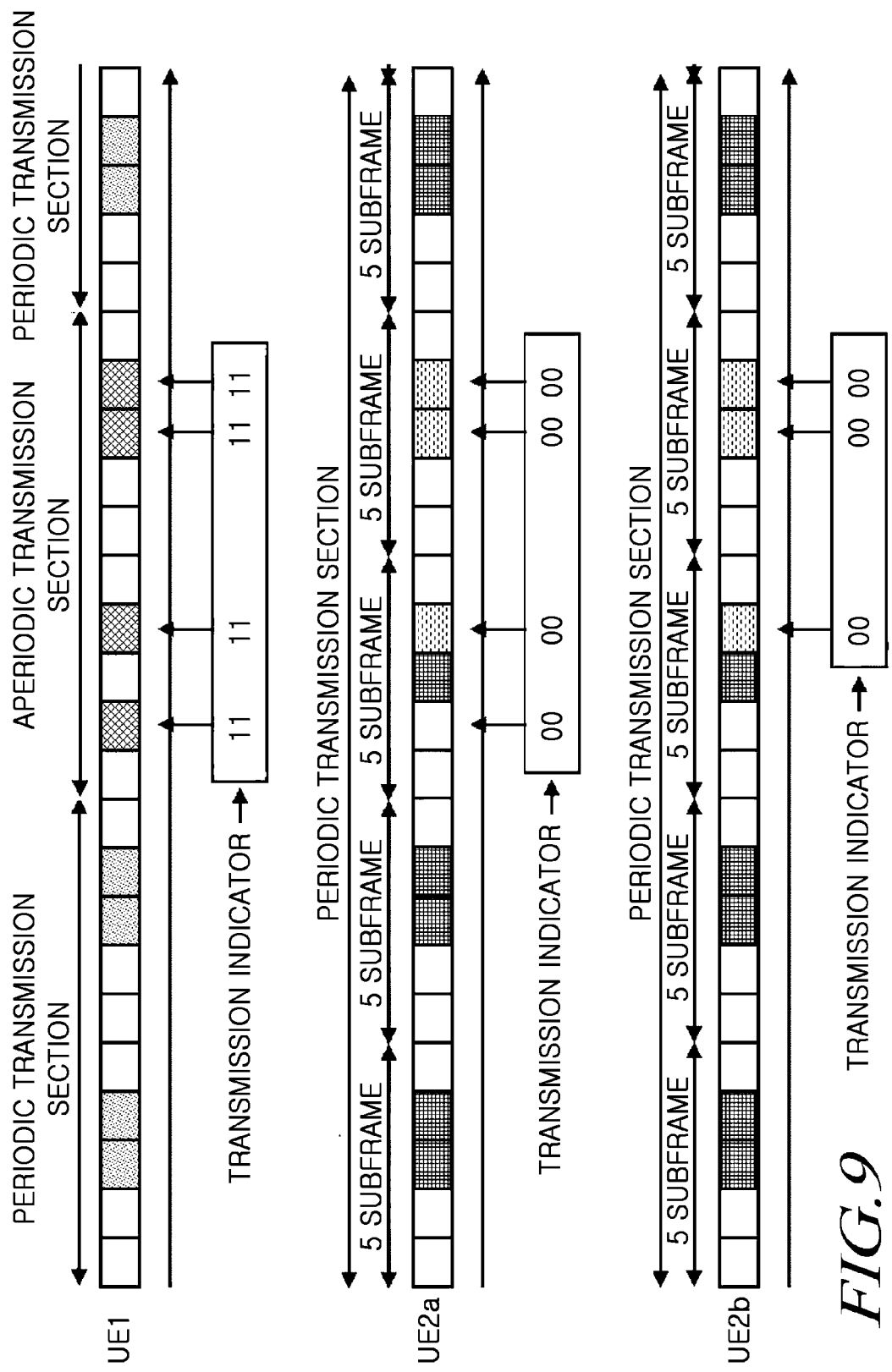
FIG. 9 is a diagram illustrating a periodic/aperiodic SRS switching scheme according to another embodiment of the present invention.

FIG. 9 illustrates a periodic/aperiodic SRS switching scheme according to another embodiment of the present invention.

FIG. 7 and FIG. 8 show an example in which a BS transmits a transmission indicator or a periodic/aperiodic indicator to only a UE, and receives an SRS. When a plurality of UEs is connected to a single BS and another UE performs periodic SRS transmission, a scheme for avoiding interference may be required.

In FIG. 9, UE1 is a UE that performs aperiodic SRS transmission and may be referred to as an 'aperiodic transmission UE', and UE2a and UE2b are referred to as 'periodic transmission UEs' that perform only periodic SRS transmission.

In an existing periodic SRS transmission section, an SRS transmission period may be determined by taking into consideration interference with a user in the same group or a neighbor cell in a case of a multi-cell, and a hopping scheme of a user may be determined. That is, users in the same cell may perform SRS transmission within a predetermined time section. However, the SRSs may be transmitted to not overlap one another for each frequency, based on a frequency hopping scheme or a comb scheme. When the SRSs overlap one another in frequency resources, code resources may be used so that the SRSs may be transmitted to not overlap one another. In FIG. 9, SRS transmission frames of UE1 and UE2a or UE2b in a first radio frame and a third radio frame corresponding to periodic SRS transmission sections, are distinguished by shading levels or colors, so as to indicate that two UEs perform SRS transmission using different resources. That is, the UEs may share time resources but use different frequency or code resources as shown in FIG. 9.

However, when UE1 corresponding to the aperiodic transmission UE performs aperiodic SRS transmission, UE1 has a probability of transmitting an SRS using the same resources as another UE that performs periodic SRS transmission, that is, the periodic transmission UE. In this example, this may cause interference between the UEs.

When resources for an SRS are sufficient and resources remain after users set frequency or code resources to not overlap one another, a problem may be unlikely to occur. However, the frequency or code resources for SRS transmission are currently insufficient and thus, a problem may be highly likely to occur.

Therefore, according to an embodiment of the present invention as shown in FIG. 9, signaling of a transmission indicator or an off trigger indicator set to reserve or turn off SRS transmission in a predetermined subframe, may be performed with respect to a UE (e.g., UE2a or UE2b) that may simultaneously receive interference when transmitting a signaling for an aperiodic SRS to a UE (e.g., UE1) and thus, SRS interference between an aperiodic transmission UE and a periodic transmission UE may be prevented.

TABLE 2

| Transmission indicator (2 bit signaling) | Function |
| --- | --- |
| 00 | Periodic SRS transmission section SRS transmission off (deactivation) |
| 01 | Reserved |
| 10 | Aperiodic SRS transmission section, SRS transmission off (deactivation) |
| 11 | Aperiodic SRS transmission section, SRS transmission on (activation) |

Similar to the transmission indicator and the periodic/aperiodic indicator described in FIGS. 7 and 8, transmission indicator of (00) indicates to apply periodic SRS transmission, and to not perform the SRS transmission or deactivate the SRS transmission in a corresponding subframe. Transmission indicator of (01) indicates to reserve the SRS transmission. Transmission indicator of (10) and transmission indicator of (11) may be used for the aperiodic SRS transmission section.

The embodiment of FIG. 9 and the embodiments of FIG. 7 and FIG. 8 have a difference. The embodiments of FIG. 7 and FIG. 8 do not separately transmit a separate transmission indicator or a periodic/aperiodic transmission indicator to another periodic transmission UE, that is, UE2a and UE2b, when a transmission indicator or a periodic/aperiodic indicator is transmitted to an aperiodic transmission UE, that is, UE1. Conversely, the embodiment of FIG. 9 may transmit an off trigger indicator that turns off the periodic SRS transmission in a corresponding subframe or a transmission indicator including the off trigger indicator, to a UE corresponding to a periodic transmission section, that is, UE2a and UE2b.

That is, in a second radio frame section where a transmission indicator or a periodic/aperiodic indicator is transmitted to UE1 corresponding to an aperiodic transmission UE for SRS transmission, a trigger indicator that indicates to not transmit an SRS with respect to all subframes (i.e., subframe No. 1, subframe No. 3, subframe No. 7, and subframe No. 8) where UE 1 transmits an aperiodic SRS or a transmission indicator of (00) including the trigger indicator may be transmitted to UE2a corresponding to another periodic transmission UE.

According to another embodiment, a trigger indicator that indicates to not transmit an SRS with respect to subframes overlapping with subframes (i.e., subframe No. 1, subframe No. 3, subframe No. 7, and subframe No. 8) (in the present specifications, the subframe may be referred to as an overlapping subframe for clear expression) where UE1 transmits an aperiodic SRS from among subframes (subframe No. 1, subframe No. 2, subframe No. 7, and subframe No. 8) where UE2b normally transmits a periodic SRS or a transmission indicator of (00) including the trigger indicator may be transmitted to UE2, as opposed to with respect to all subframes (i.e., subframe No. 1, subframe No. 3, subframe No. 7, and subframe No. 8) where UE1 transmits an aperiodic SRS.

That is, the trigger indicator that indicates to not transmit an SRS with respect to three subframes corresponding to the subframe No. 1, the subframe No. 7, and the subframe No. 8, which are overlapping subframes as shown in the case of UE2b of FIG. 9, or the transmission indicator of (00) including the trigger indicator may be transmitted.

Interference between SRSs of UE1 and UE2 may not occur by applying the embodiment of FIG. 9.

Figure 10:
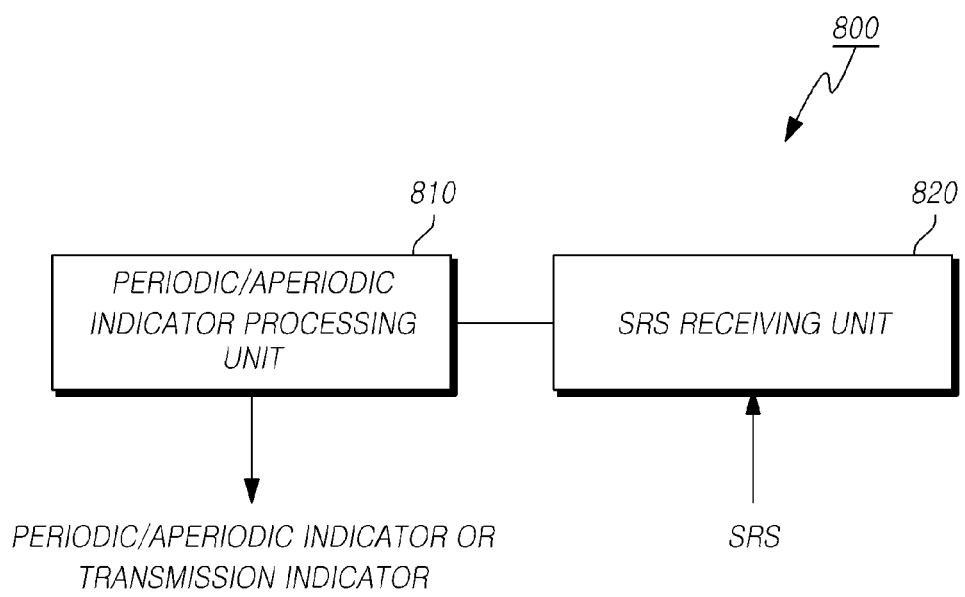
FIG. 10 is a block diagram illustrating a configuration of an SRS receiving apparatus to which a periodic/aperiodic SRS switching method is applied according to an embodiment of the present invention.

FIG. 10 illustrates a configuration of an SRS receiving apparatus to which a periodic/aperiodic SRS switching method is applied according to an embodiment of the present invention.

The SRS receiving apparatus according to the embodiment of the present invention may be embodied in a BS, and when the SRS receiving apparatus is embodied to be a device for receiving an SRS (e.g., a BS and the like) or is embodied to be a portion of the device, the device may generate and transmit, to a corresponding device, a periodic/aperiodic indicator or a transmission indicator including the periodic/aperiodic indicator, may receive an SRS transmitted periodically and aperiodically in response to the transmission, and may estimate a UL channel status by receiving the SRS.

An SRS receiving apparatus 800 may include a periodic/aperiodic indicator processing unit 810 and an SRS receiving unit 820.

Although the entire communication system including the SRS receiving apparatus is not illustrated, the communication system may further include component elements of a transmitting apparatus such as a scrambler, a modulation mapper, a layer mapper, a precoder, a resource element (RE) mapper, an OFDM signal generator, and the like. However, the configuration may not be always required in the embodiment of the present invention.

The periodic/aperiodic indicator processing unit 810 of the SRS receiving apparatus 800 may determine whether switching of a periodic SRS transmission mode into an aperiodic SRS transmission mode or the reversal thereof is required for a predetermined UE. When switching is required, the periodic/aperiodic indicator processing unit 810 may generate a periodic/aperiodic indicator signal or a transmission indicator including the periodic/aperiodic indicator signal, and may transmit the same to a corresponding UE through an L1 or L2 signaling.

That is, when the switching of the periodic SRS transmission mode to the aperiodic SRS transmission mode is required, a subframe where an aperiodic SRS is to be transmitted is determined in a radio frame that requires aperiodic SRS transmission, and a transmission indicator 10 or a transmission indicator 11 including the periodic/aperiodic indicator may be generated and may be transmitted to the corresponding UE.

Also, the periodic/aperiodic indicator processing unit 810 of the periodic/aperiodic SRS switching apparatus 800 may generate and transmit a transmission indicator including an off trigger indicator so as to not transmit an SRS with respect to at least one overlapping subframe from among subframes in the aperiodic SRS transmission section, for other periodic transmission UEs, when a UE that is switched to an aperiodic SRS, as described in FIG. 9.

In this example, the subframe through which the off trigger indicator is transmitted may be all subframes (i.e., UE2a of FIG. 9) where an aperiodic SRS is transmitted, or may be overlapping subframes (i.e., UE2a of FIG. 9) overlapping with the subframes where an aperiodic SRS is transmitted from among subframes where a periodic SRS is transmitted.

The SRS receiving unit 820 of the SRS receiving apparatus 800 may receive an SRS signal transmitted from the UE, periodically or aperiodically based on the periodic/aperiodic indicator or the transmission indicator including the periodic/aperiodic indicator, and may estimate a UL channel status of the corresponding UE by receiving the SRS signal.

Although there may be varied environments that require switching of a periodic SRS transmission mode to an aperiodic SRS transmission mode according to an embodiment of the present invention, the environment may include a case of entering an overlapping coverage area in a grouping SRS environment, a case of dynamic switching between a multi-user MIMO (MU-MIMO) and a single user MIMO (SU- MIMO), or a case of transmitting an SRS more frequently or less frequently than periodic transmission based on a channel status.

In the case of entering the overlapping coverage area in the grouping SRS environment, for example, when it is assumed that there exist an SRS group A that transmits an SRS in subframe No. 1, subframe No. 2, subframe No. 3, an SRS group B that transmits an SRS in subframe No. 1, subframe No. 2, and subframe No. 4, and an SRS group C that transmits an SRS in subframe No. 1, subframe No. 4, and subframe No. 5, and coverage of SRS groups partially overlap one another, and it is also assumed that a UE that periodically transmits an SRS in subframe No. 1, subframe No. 2, and subframe No. 3 (i.e., a UE in the SRS group A) enters an overlapping coverage area between the group A and the group B and moves to the group B, an SRS may need to be transmitted in a subframe that is different from one of the subframe No. 1, the subframe No. 2, the subframe No. 3, and the subframe No. 4 in the overlapping coverage area and thus, an SRS may be aperiodically transmitted in subframe No. 6, subframe No. 7, and subframe No. 8.

In this example, an SRS may need to be aperiodically transmitted in a few radio frame sections and thus, switching from the periodic SRS transmission mode to the aperiodic SRS transmission mode may be required.

Also, in the case of switching from the SU-MIMO to the MU-MIMO and the like, SRS interference with another user may need to be temporarily avoided and thus, switching may need to be performed so that an SRS that is periodically transmitted is transmitted aperiodically.

Also, in the case in which little change occurs in SRS transmission since a channel status is good, such as a case where a UE stops, an SRS may be controlled to be transmitted less frequently than a period of the periodic SRS transmission for efficiency. In this example, an SRS transmission mode may be controlled to be temporarily switched to the aperiodic SRS transmission mode. Conversely, when a UL channel status significantly varies, an SRS may be controlled to be transmitted more frequently than the periodic SRS transmission. In this example, switching to the aperiodic SRS transmission mode may be performed.

In the environment which requires switching to the aperiodic SRS, when an instruction to switch into the aperiodic SRS mode uses a radio resource control (RRC) signaling of an existing L3 (i.e., an application layer) and the like, a delay of about 15 ms may occur and thus, a dynamic switching may not be performed.

To transmit the periodic/aperiodic indicator or the transmission indicator including the periodic/aperiodic indicator, an L1 signaling or an L2 signaling having a transmission period of about 1 ms may be used.

The periodic/aperiodic indicator or the transmission indicator including the periodic/aperiodic indicator may be, for example, separately defined to be included in a form similar to a DCI format and may be transmitted through a PDCCH channel, but this may not be limited thereto.

However, the embodiment of the present invention may not always use the L1 signaling or the L2 signaling, and may use any signaling that may not deteriorate channel estimation performance during switching between the periodic SRS transmission and the aperiodic SRS transmission.

Figure 11:
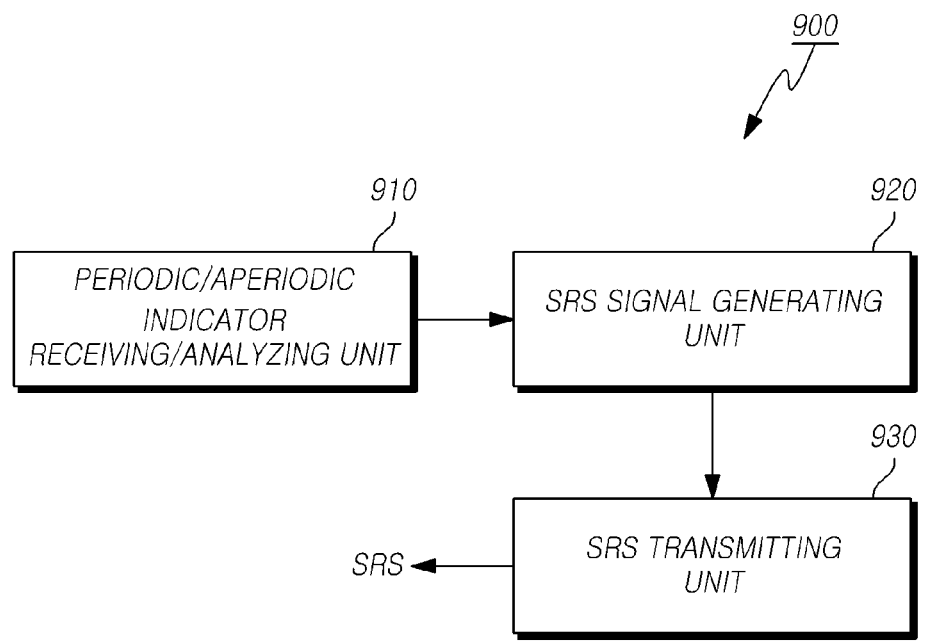
FIG. 11 is a block diagram illustrating an example of an SRS transmitting apparatus according to an embodiment of the present invention.

FIG. 11 illustrates an example of an SRS transmitting apparatus according to an embodiment of the present invention.

The SRS transmitting apparatus may be a UE or a component element included the UE, but it may not be limited thereto.

Although the SRS transmitting apparatus is not illustrated, the SRS transmitting apparatus may include a scrambler, a modulation mapper, a layer mapper, a precoder, an RE mapper, an OFDM signal generator as a general configuration of a transmitting side of the UE, and may include a periodic/aperiodic indicator receiving/analyzing unit 910, an SRS signal generating unit 920, an SRS transmitting unit 930, and the like as a characterizing configuration.

The periodic/aperiodic indicator receiving/analyzing unit 910 may receive a transmission indicator including a periodic/aperiodic indicator from the SRS receiving apparatus of FIG. 10, may determine a predetermined subframe in a periodic SRS transmission section to be a periodic SRS transmission subframe based on the transmission indicator, and may determine a predetermined subframe in an aperiodic SRS transmission section to be an aperiodic SRS transmission subframe based on the transmission indicator.

The SRS signal generating unit 920 may generate an SRS sequence that estimates a UL channel status based on Equation 1 and the like.

The SRS transmitting unit 930 may perform mapping of the generated SRS signal or the SRS sequence on the periodic SRS transmission subframe and the aperiodic SRS transmission subframe, and may perform transmission to a BS and the like.

Figure 12:
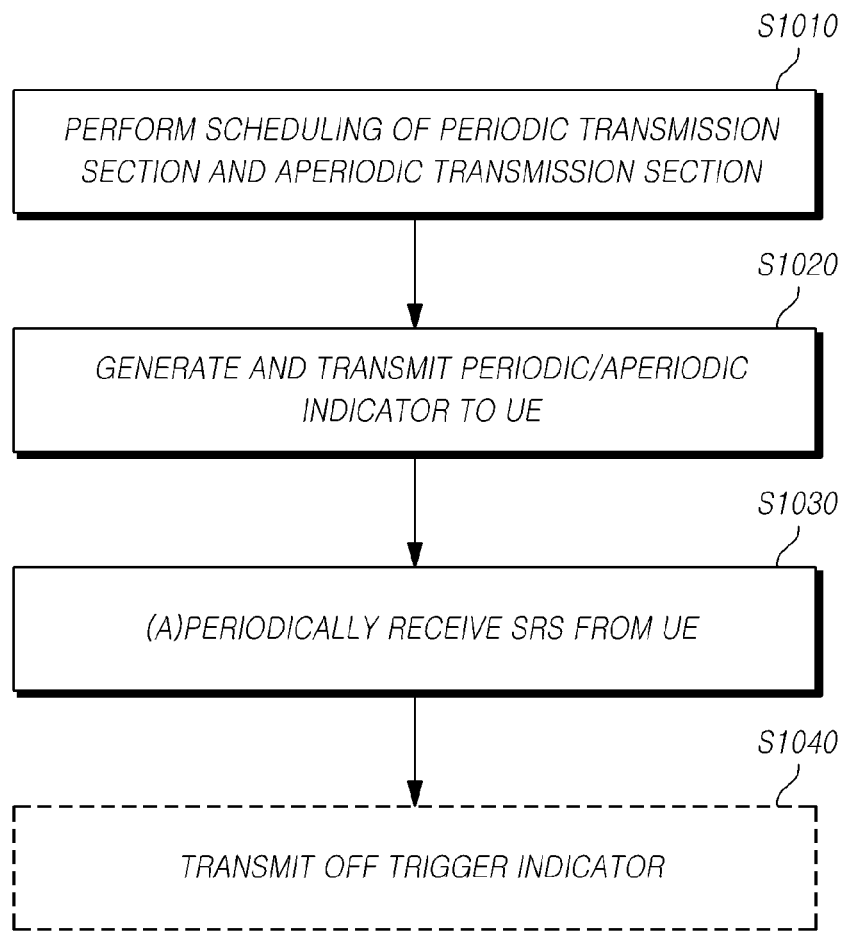
FIG. 12 and FIG. 13 are flowcharts illustrating a detailed periodic/aperiodic SRS switching method according to an embodiment of the present invention.
Figure 13:
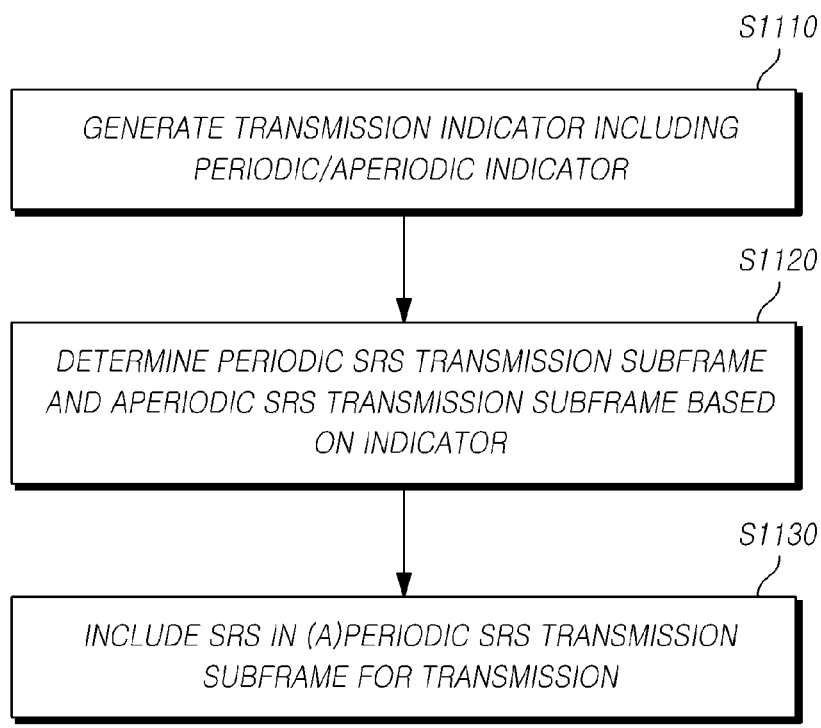

FIGS. 12 and 13 illustrate a detailed periodic/aperiodic SRS switching method according to an embodiment of the present invention. FIG. 12 shows a method of generating and transmitting a periodic/aperiodic indicator or a transmission indicator including the periodic/aperiodic indicator. FIG. 13 shows a method of receiving and analyzing the transmission indicator including the periodic/aperiodic indicator, and transmitting an SRS based on the analysis result.

In a case where an SRS in a UL is used as a channel estimation reference signal, the method of FIG. 12 may be performed by a BS, and the method of FIG. 13 may be performed by the UE. However, this may not be limited thereto.

In the periodic/aperiodic SRS switching method according to the embodiment of the present invention, the process performed by the BS may include an operation (step S1010) in which the BS performs scheduling of a periodic SRS transmission section and an aperiodic SRS transmission section with respect to a predetermined UE, an operation (step S1020) of generating a periodic/aperiodic indicator or a transmission indicator including the periodic/aperiodic indicator and transmitting the same to the UE as illustrated in FIGS. 7 through 9, and an operation (step S1030) of periodically and aperiodically receiving an SRS from the corresponding UE.

In a case of a multi-UE or a multi-cell environment, the process may further include an operation (step S1040) of generating an off trigger indicator that indicates to not transmit a periodic SRS with respect to an aperiodic SRS transmission subframe in the aperiodic SRS transmission section and transmitting the off trigger indicator to another UE (i.e., periodic transmission UE) that performs only periodic SRS transmission excluding a UE (i.e., aperiodic transmission UE) that performs aperiodic SRS transmission.

In this example, the periodic transmission UE that receives the off trigger indicator may not perform periodic SRS transmission with respect to the subframe indicated by the SRS deactivation indicator.

In the periodic/aperiodic SRS switching method according to embodiments of the present invention, the process performed by the UE may include an operation (step S1110) in which the UE receives the transmission indicator including the periodic/aperiodic indicator from the BS, an operation (step S1120) in which the UE determines a predetermined subframe in the periodic SRS transmission section to be a periodic SRS transmission subframe based on the transmission indicator, and determines a predetermined subframe in the aperiodic SRS transmission section to be an aperiodic SRS transmission subframe based on the transmission indicator, and an operation (step S1130) in which the UE includes an SRS in the determined periodic SRS transmission subframe and the aperiodic SRS transmission subframe for transmission.

In this example, the transmission indicator may be formed as a signal of two or more bits, and may be transmitted through an L1 signaling or an L2 signaling, but this may not be limited thereto.

Also, at least one bit of the transmission indicator of two or more bits may be the periodic/aperiodic indicator indicating whether a corresponding subframe belongs to the periodic transmission section or the aperiodic transmission section, and remaining bits may be a trigger indicator indicating whether SRS transmission is to be activated or deactivated in the corresponding subframe, but this may not be limited thereto.

Although the method of performing periodic SRS transmission and aperiodic SRS transmission in an environment where one or more UEs exist in a single cell has been described in the foregoing, the periodic/aperiodic SRS transmission switching according to embodiment of the present invention may transmit a channel estimation reference signal for each cell or based on whether a transmission mode is a periodic transmission mode or an aperiodic transmission mode.

A type of a currently discussed BS may include a micro BS such as a femto cell and the like, in addition to a macro BS. A cell structure including the micro BS and the macro BS together may be highly likely to be the general cell structure.

In this example, the micro BS has less mobility than the macro BS, and a number of the micro BSs is fewer than a number of the macro BSs. Therefore, users in the micro BS may not need to frequently perform SRS reporting due to low mobility. Also, the micro BS may completely control all the users since a number of existing users is small.

Therefore, aperiodic SRS transmission may be a more appropriate scheme for the micro BS. That is, the macro BS may periodically transmit an SRS, and the micro BS may aperiodically transmit an SRS and thus, interference caused by SRS transmission between the micro BS and the macro BS may be overcome.

A user who is handed over from the macro BS to the micro BS may switch a transmission mode into an aperiodic SRS transmission mode within an appropriate period of time through an aperiodic SRS trigger signaling. A user who is handed over from the micro BS to the macro BS may use aperiodic SRS transmission, and may transmit an SRS at the same periods as the periodic SRS transmission of the macro BS.

Therefore, the user may transmit an SRS in the same format as the periodic SRS transmission through use of the aperiodic SRS transmission mode until the transmission mode is switched into the periodic SRS transmission mode of the macro BS. Through a handover signaling, a periodic SRS configuration of the macro BS may be set in advance.

According to another embodiment, a method of distinguishing periodic/aperiodic SRS transmission modes for each antenna may be available. In an MIMO environment, a number of antennas of the UE may increase up to 4. Therefore, to effectively support an MIMO scheme, all the four antennas need to transmit distinguished SRSs, and an SRS for each antenna may not interfere with one another.

To satisfy the conditions, a predetermined antenna (i.e., group) may periodically transmit an SRS and remaining antennas (i.e., groups) may transmit an SRS in an aperiodic manner. The predetermined antenna group may be regrouped based on a change of a transmission mode of the UE. In the SRS transmission for each antenna, a dynamic scheduling flexibility may be maximized.

Although the embodiments of the present invention have been described based on an SRS, the embodiments may be equivalently applicable to all types of channel estimation reference signals that are periodically transmitted.

A radio frame, a subframe and the like used in the embodiments of the present invention may not be construed as a specific term, and may be inclusively understood as a time unit used for transmitting a signal in a communication system.

According to the embodiment of the present invention, a channel estimation reference signal that is periodically transmitted, such as an SRS, may be controlled to be aperiodically transmitted in a few sections through use of switching and thus, an SRS capacitor may be improved and an SRS scheduling flexibility may be improved.

Also, a periodic/aperiodic indicator that is a separate signaling may be used during switching of the periodic SRS transmission and the aperiodic SRS transmission and thus, inter-UE interference and inter-cell interference may be minimized and an efficiency of SRS transmission may be improved.

In particular, in a communication system environment where a corresponding user needs to perform transmission and reception of a reference signal with a neighbor cell in addition to a service cell with which the user mainly performs transmission and reception, such as a CoMP, when a periodic/aperiodic indicator that is a separate signaling is used during switching of the periodic SRS transmission and the aperiodic SRS transmission, a periodically transmitted SRS may be controlled to be aperiodically transmitted and thus, an SRS scheduling flexibility may increase and an SRS capacitor may be improved.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of switching periodic transmission and aperiodic transmission of a channel estimation reference signal for scheduling resources in a communication system, the method comprising:
   determining a periodic transmission section where the channel estimation reference signal is periodically transmitted, and an aperiodic transmission section where the channel estimation reference signal is aperiodically transmitted; and
   generating and transmitting a periodic/aperiodic indicator to distinguish the periodic transmission section and the aperiodic transmission section, or a transmission indicator including the periodic/aperiodic indicator,
   wherein the transmission indicator is formed of two or more bits, and
   wherein the transmission indicator comprises the periodic/aperiodic indicator of one or more bits indicating whether a corresponding subframe belongs to the periodic transmission section or the aperiodic transmission section, and a trigger indicator of one bit indicating whether to activate transmission of a channel estimation reference signal in the corresponding subframe.

2. The method as claimed in claim 1, wherein the periodic/aperiodic indicator or the transmission indicator is transmitted at time intervals, the time interval being sufficient for adaptation to a dynamic environment that requires switching between the periodic transmission and aperiodic transmission.

3. The method as claimed in claim 2, wherein the periodic/aperiodic indicator or the transmission indicator is transmitted through a physical layer (L1) signaling or a data link layer (L2) signaling.

4. The method as claimed in claim 3, wherein the periodic/aperiodic indicator or the transmission indicator is included in a separately defined downlink control information (DCI) format, and is transmitted through a physical downlink control channel (PDCCH).

5. The method as claimed in claim 1, wherein the periodic/aperiodic indicator or the transmission indicator including the periodic/aperiodic indicator is set to transmit a channel estimation reference signal in only aperiodic transmission subframes corresponding to a few subframes in the aperiodic transmission section.

6. The method as claimed in claim 5, wherein the aperiodic transmission subframe is selected within a characterized range of subframes from among a plurality of subframes in the aperiodic transmission section.

7. The method as claimed in claim 1, wherein, for a periodic transmission user equipment (UE) to which only the periodic transmission section is applied, excluding an aperiodic transmission UE to which the aperiodic transmission section is applied, the method further comprises:
   transmitting, by the periodic transmission UE, an Off trigger indicator that indicates to not transmit a channel estimation reference signal in a subframe where the aperiodic transmission UE transmits a channel estimation reference signal.

8. An apparatus for receiving a channel estimation reference signal for scheduling resources in a communication system, the apparatus comprising:
   a periodic/aperiodic indicator processing unit to determine whether switching between a periodic transmission mode and an aperiodic transmission mode for a channel estimation reference signal is required, and to generate and transmit a periodic/aperiodic indicator of one or more bits instructing switching of a mode or a transmission indicator of two or more bits including the periodic/aperiodic indicator; and
   a channel estimation reference signal receiving unit to periodically and aperiodically receive a channel estimation reference signal transmitted from a corresponding apparatus, based on the periodic/aperiodic indicator or the transmission indicator,
   wherein the periodic/aperiodic indicator of one or more bits indicates whether a corresponding subframe belongs to a periodic transmission section or an aperiodic transmission section, and
   wherein the transmission indicator comprises a trigger indicator of one bit indicating whether to activate transmission of a channel estimation reference signal in the corresponding subframe.

9. An apparatus for transmitting a channel estimation reference signal for scheduling resources in a communication system, the apparatus comprising:
   a periodic/aperiodic indicator receiving/analyzing unit to receive a transmission indicator including a periodic/aperiodic indicator of one or more bits, to determine a predetermined subframe in a periodic transmission section to be a periodic channel estimation reference signal transmission subframe based on the transmission indicator, and to determine a predetermined subframe in an aperiodic transmission section to be an aperiodic channel estimation reference signal transmission subframe based on the transmission indicator;
   a channel estimation reference signal generating unit to generate a channel estimation reference signal; and
   a channel estimation reference signal transmitting unit to perform mapping of the generated channel estimation reference signal on the periodic channel estimation reference signal transmission subframe and the aperiodic channel estimation reference signal transmission subframe, for transmission,
   wherein the periodic/aperiodic indicator of one or more bits indicates whether a corresponding subframe belongs to the periodic transmission section or the aperiodic transmission section, and
   wherein the transmission indicator further comprises a trigger indicator of one bit indicating whether to activate transmission of a channel estimation reference signal in the corresponding subframe.

10. A method of receiving a channel estimation reference signal for scheduling resources in a communication system, the method comprising:

scheduling a periodic channel estimation reference signal transmission section and an aperiodic channel estimation reference signal transmission section, with respect to a predetermined UE;

generating a transmission indicator including a periodic/aperiodic indicator of one or more bits, and transmitting the transmission indicator to the UE; and receiving a channel estimation reference signal periodically and aperiodically, from the corresponding UE, wherein the periodic/aperiodic indicator of one or more bits indicates whether a corresponding subframe belongs to a periodic transmission section or an aperiodic transmission section, and wherein the transmission indicator further comprises a trigger indicator of one bit indicating whether to activate transmission of a channel estimation reference signal in the corresponding subframe.

11. A method of transmitting a channel estimation reference signal for scheduling resources in a communication system, the method comprising:

receiving a transmission indicator including a periodic/aperiodic indicator of one or more bits;

determining a predetermined subframe in a periodic transmission section to be a periodic channel estimation reference signal transmission subframe based on the transmission indicator, and determining a predetermined subframe in an aperiodic transmission section to be an aperiodic channel estimation reference signal transmission subframe based on the transmission indicator; and transmitting the channel estimation reference signal by including the channel estimation reference in the determined periodic channel estimation reference signal transmission subframe and the aperiodic channel estimation reference signal transmission subframe, wherein the periodic/aperiodic indicator of one or more bits indicates whether a corresponding subframe belongs to the periodic transmission section or the aperiodic transmission section, and wherein the transmission indicator further comprises a trigger indicator of one bit indicating whether to activate transmission of a channel estimation reference signal in the corresponding subframe.

* * * * *